(12) United States Patent
Scholz et al.

(10) Patent No.: US 6,802,131 B1
(45) Date of Patent: Oct. 12, 2004

(54) SIDE-ILLUMINATED TARGET STRUCTURE HAVING UNIFORM RING ILLUMINATION

(75) Inventors: Robert Scholz, Oxnard, CA (US); Jiangang Xia, Midland (CA)

(73) Assignee: Raytheon Company, Walthem, MA (US)

( * ) Notice: Subject to any disclaimer, the term of this patent is extended or adjusted under 35 U.S.C. 154(b) by 0 days.

(21) Appl. No.: 10/235,322

(22) Filed: Sep. 5, 2002

(51) Int. Cl.⁷ .............................................. G01C 15/06
(52) U.S. Cl. ........................... 33/293; 33/265; 42/132; 362/31
(58) Field of Search .......................... 33/293, 265, 506; 42/111, 113, 122, 123, 130, 131, 132; 362/84, 31, 110, 138, 253, 577

(56) References Cited

U.S. PATENT DOCUMENTS

| | | | | |
|---|---|---|---|---|
| 804,624 | A | * | 11/1905 | Saegmuller ................. 359/428 |
| 1,302,353 | A | * | 4/1919 | Friedrich .................. 250/467.1 |
| 1,529,643 | A | * | 3/1925 | Fenderl ....................... 359/439 |
| 2,171,571 | A | * | 9/1939 | Karnes ......................... 42/123 |
| 2,490,091 | A | * | 12/1949 | Reardon ................... 250/467.1 |
| 4,422,719 | A | * | 12/1983 | Orcutt ......................... 385/123 |
| 4,743,765 | A | * | 5/1988 | Ekstrand .................. 250/467.1 |
| 4,792,673 | A | | 12/1988 | Blackler |
| 4,929,169 | A | | 5/1990 | Fujigaki et al. |
| 5,065,520 | A | | 11/1991 | Shimizu et al. |
| 5,148,603 | A | * | 9/1992 | Beutler ......................... 33/265 |
| 5,157,839 | A | * | 10/1992 | Beutler ......................... 33/265 |
| 5,283,427 | A | | 2/1994 | Phillips et al. |
| 5,312,569 | A | | 5/1994 | Mezei |
| 5,339,227 | A | | 8/1994 | Jones |
| 5,341,791 | A | * | 8/1994 | Shafer .......................... 124/87 |
| 5,414,557 | A | | 5/1995 | Phillips |
| 5,653,034 | A | * | 8/1997 | Bindon ......................... 42/131 |
| 5,715,607 | A | | 2/1998 | Murg |
| 5,926,963 | A | | 7/1999 | Knight |
| 6,081,373 | A | * | 6/2000 | Bryant et al. ................ 359/424 |
| 6,082,012 | A | * | 7/2000 | McLeod ....................... 33/265 |
| 6,516,551 | B2 | * | 2/2003 | Gaber ......................... 42/132 |
| 6,571,482 | B1 | * | 6/2003 | Tymianski ................... 33/265 |
| 6,581,317 | B1 | * | 6/2003 | Slates .......................... 42/132 |
| 6,601,308 | B2 | * | 8/2003 | Khoshnood .................. 33/265 |

* cited by examiner

Primary Examiner—Christopher W. Fulton
Assistant Examiner—Amy R Cohen
(74) Attorney, Agent, or Firm—William C. Schubert

(57) ABSTRACT

An illuminated target structure for viewing a scene includes a transparent medium having a transparent-medium peripheral rim and a light-reflective target within a transparent-medium central region. A circumferentially uniform ring illumination source is in contact with the transparent-medium peripheral rim. The ring illumination source projects a substantially uniform illumination into the transparent-medium peripheral rim and thence onto the light-reflective target. The ring illumination source preferably is a modified optical fiber structure having a modified lateral surface in facing relation to the transparent-medium peripheral rim and having a light leakage through the modified lateral surface. An image intensifier may be positioned in facing relation to a transparent-medium front face.

18 Claims, 2 Drawing Sheets

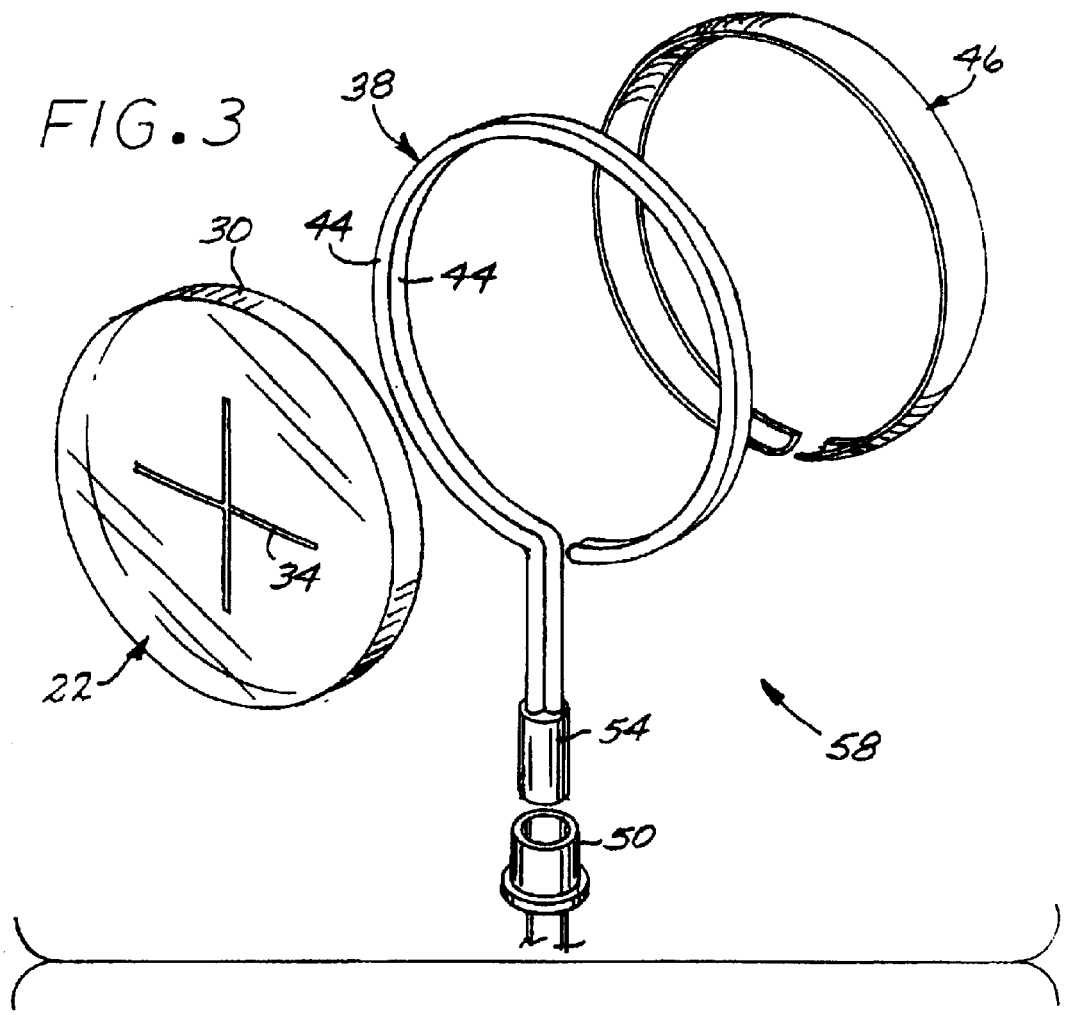
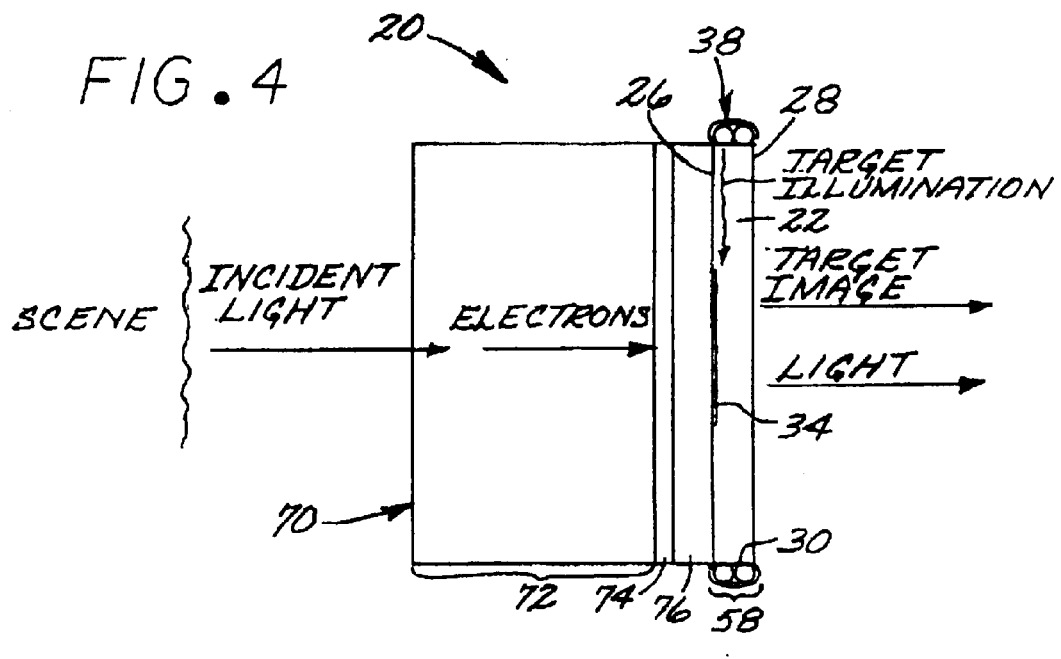

SIDE-ILLUMINATED TARGET STRUCTURE HAVING UNIFORM RING ILLUMINATION

This invention relates to an illuminated target structure and, more particularly, to such a target structure used in conjunction with an image intensifier.

BACKGROUND OF THE INVENTION

A reticle-type target structure is often provided in the viewing area of a sighting device such as an aiming scope used with a weapon, a telescope, or the like. The target structure identifies a boresight, or it may provide other sighting information. The target structure may be, for example, in the form of a bore-sighted cross hair, concentric circles, or an array of lines denoting elevations, lateral deviations, and the like. In one familiar form, the target structure is a pair of perpendicular wires that form a crosshair aiming arrangement.

The target structure must provide sufficient contrast with the background of the viewed scene that the target structure is visible against the background. For target structure sighting in conventional conditions of high-background-intensity visible light, such as a conventional rifle scope, non-illuminated dark wires provide sufficient contrast with the generally light background. If the background is darker, as in twilight conditions, it may be necessary to illuminate the target structure to produce sufficient contrast, so that the target structure is lighter in color against the dark background. In one approach, the wires forming the target structure are electrically conductive, and are heated by passing an electrical current through them so that they glow slightly. In another approach, the target structure is formed by light-reflective features, and light is directed against the target structure from the front or back so that the target structure is visible by virtue of the light that reflects from it.

In one application, the target structure is provided as an attachment to an image intensifier system for viewing a scene under low-light conditions. One common form of image-intensifier system employs a semiconductor layer that emits electrons responsive to very low levels of incident light. The electron current is amplified and impinges upon a phosphor-containing screen. The resulting emitted light is viewed by the user.

In an approach as discussed further herein, the target structure is desirably placed between the phosphor-containing screen and the user, and very close to the phosphor-containing screen to minimize parallax effects. The target structure must be illuminated because the viewed scene background is relatively dark, even with the image intensification. Existing target-structure illumination techniques are not satisfactory, as they produce uneven illumination that is distracting to the user.

There is accordingly a need for an improved target-structure-illumination technique for general applications, but particularly for use with image intensifiers. The present invention fulfills this need, and further provides related advantages.

SUMMARY OF THE INVENTION

The present invention provides an illuminated target structure that may be used generally but is most advantageously employed with image intensifiers. The present approach produces even illumination without glare zones or other uneven features in the field of view. The contrast of the target structure is readily controllable.

In accordance with the invention, an illuminated target structure for viewing a scene comprises a transparent medium having a transparent-medium central region, a transparent-medium front face, a transparent-medium back face, a transparent-medium peripheral rim extending between the transparent-medium front face and the transparent-medium back face, and a light-reflective target in light communication with the transparent-medium central region. A circumferentially uniform ring illumination source is in contact with the transparent-medium peripheral rim. The ring illumination source projects a substantially uniform illumination into the transparent-medium peripheral rim. The ring illumination source preferably comprises a modified optical fiber structure having a modified lateral surface in facing relation to the transparent-medium peripheral rim and having a light leakage through the modified lateral surface. The light leakage is preferably produced by a controllable roughening of a limited portion of the circumference of the modified lateral surface of the modified optical fiber structure.

The modified optical fiber structure preferably extends around substantially all of the transparent-medium peripheral rim. There is thus at least one turn of the modified optical fiber extending around substantially all of the transparent-medium peripheral rim. In one form, there is additionally an optional reflective layer overlying at least one turn of the modified optical fiber, such that at least one turn of the modified optical fiber lies between the reflective layer and the transparent-medium peripheral rim. There may be at least two, or more, turns of the modified optical fiber. Typically, a transparent adhesive layer binds the modified lateral surface of the modified optical fiber structure to the transparent-medium peripheral rim. The adhesive layer is selected to facilitate efficient optical coupling of light from the modified optical fiber structure into the transparent medium, typically by selection of the index of refraction of the adhesive.

A light source such as a light-emitting diode is coupled into an end of the modified optical fiber structure. Preferably, the light source is located remotely from the transparent medium and does not directly illuminate the transparent medium. The light source is preferably selected to have a color different from that of a scene predominant color band.

In an application of particular interest, there is an image intensifier in facing relation to the transparent-medium front face. In the usual configuration, a phosphor layer of the image intensifier is in facing or adjacent relation to the transparent-medium front face. In that case, the light-reflective target preferably lies at the transparent-medium front face immediately or closely adjacent to the phosphor layer of the image intensifier.

The target structure of the present approach is uniformly illuminated and does not produce shadows, glare, or the like in the field of view, even when the target structure is used with an image-intensifier tube. As a result of the illumination uniformity produced by the present approach, in the image-intensifier application the diffuse and specular reflectivity of the phosphor layer of the image intensifier does not cause the observed scene to have non-uniform illumination artifacts. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is an exploded view of the target structure of FIG. 1; and

FIG. 4 is a schematic side elevational view of an image intensifier utilizing the target structure.

DETAILED DESCRIPTION OF THE INVENTION

Figure 1:
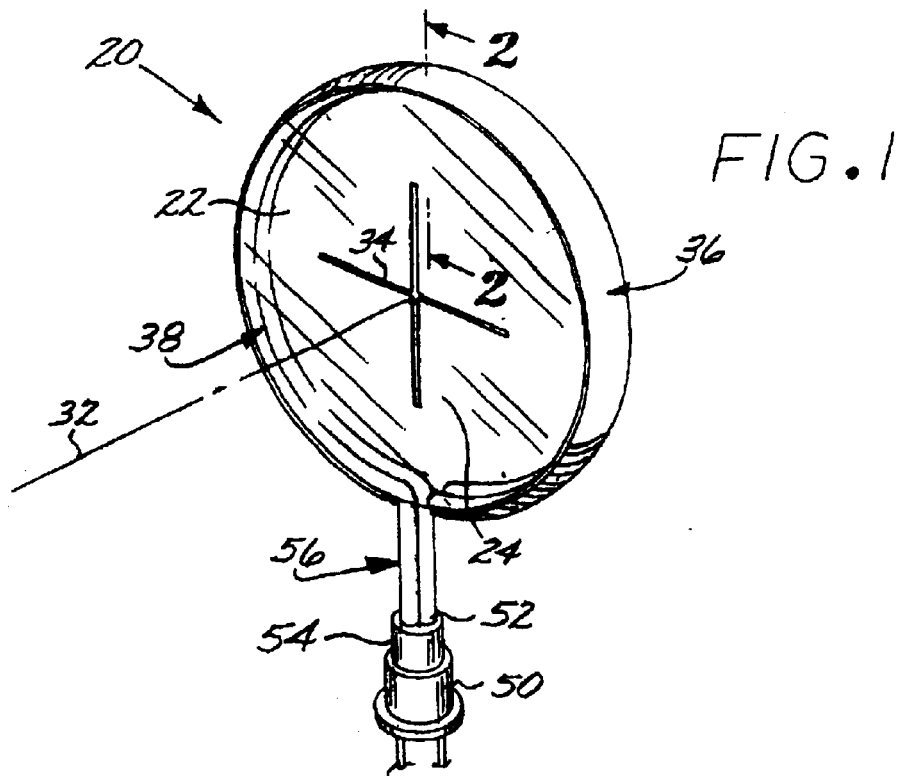
FIG. 1 is a schematic perspective view of a target structure.
Figure 2:
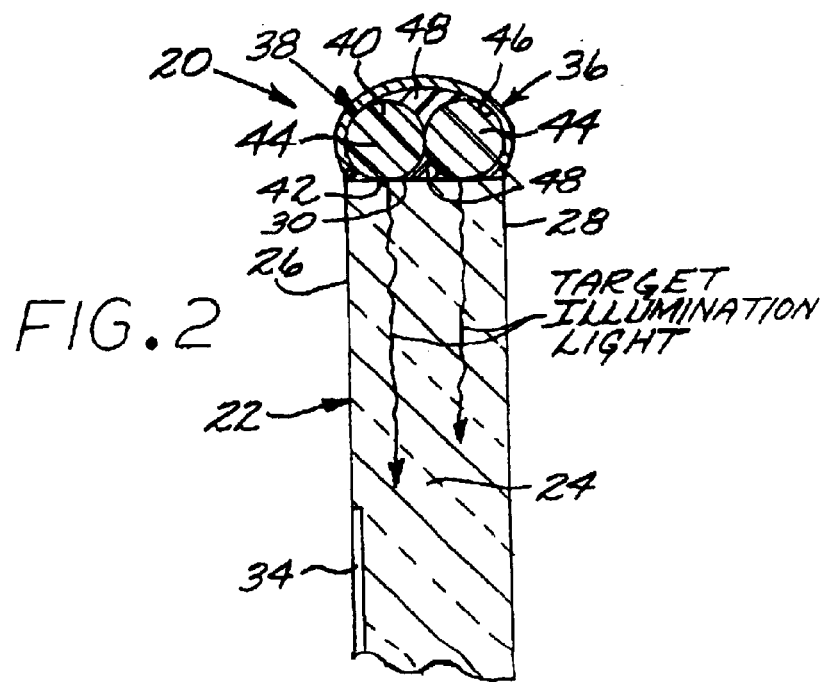
FIG. 2 is a sectional view of the target structure, taken on line 2—2 of FIG. 1.

FIG. 1 depicts an illuminated target structure 20 for viewing a scene, and FIG. 2 is a sectional view near the peripheral rim of the illuminated target structure 20. The target structure 20 includes a transparent medium 22 having a transparent-medium central region 24, a transparent-medium front face 26, and a transparent-medium back face 28. A transparent-medium peripheral rim 30 extends around the circumference of the transparent medium 22 and between the transparent-medium front face 26 and the transparent-medium back face 28. Desirably, the transparent-medium peripheral rim 30 is optically polished to minimize reflection when illuminated. The transparent-medium peripheral rim 30 may instead be left with a fine ground surface finish. The transparent medium 22 is made of a material that is transparent to the light wavelengths of interest. For visible light, the transparent medium 22 is preferably made of glass. The transparent medium 22 may be of any shape, but it is preferably generally cylindrically symmetric about a cylindrical axis 32, with the back face 28 being parallel and perpendicular to the cylindrical axis 32. The back face 28 is typically anti-reflection coated for an air-glass interface. In the preferred embodiment, the curvature of the front face 26 is matched to the curvature of the image intensifier phosphor window to be discussed subsequently.

The target structure 20 further includes a light-reflective target 34 in light communication with the transparent-medium central region 24. The light-reflective target 34 is typically etched or otherwise formed onto the front face 26 of the transparent-medium central region 24 of the transparent medium 22, as illustrated, and extends a short distance into the transparent medium 22. The target may equivalently be defined at other locations such as on the outward (downstream) face of an adjacent substrate 76, so that it is in light communication with the transparent-medium central region 24 but in the adjacent structure. The target 34 may optionally be filled with a reflecting or fluorescent material. The target 34 is pictured as a cross-hairs pattern, but it may be of any type such as concentric circles or an array of lines denoting elevations, lateral deviations, and the like. The target 34 is formed by any operable approach, such as etching or lithography, in the transparent medium 22 or the adjacent structure. The formation of light-reflective targets 34 in transparent media is known in the art. (As used herein, "target" refers to an element formed in the transparent-medium central region or adjacent regions, not to any feature in the scene that is viewed through the transparent medium 22.)

An illumination source 36 is in optical communication with, and preferably in contact with, the transparent-medium peripheral rim 30. The illumination source 36 comprises a circumferentially uniform ring illumination source 38 in contact with the transparent-medium peripheral rim 30. The ring illumination source 38 projects a substantially uniform illumination radially inwardly into the transparent-medium peripheral rim 30 and thence into the transparent-medium central region 24 to illuminate the target 34.

The ring illumination source 38 preferably comprises a modified optical fiber structure 40 having a modified lateral surface 42 in facing relation to the transparent-medium peripheral rim 30 and having a light leakage through the modified lateral surface 42. In the illustrated embodiment, the modified optical fiber structure 40 extends around substantially all of the transparent-medium peripheral rim 30. That is, at least one turn of modified optical fiber 44 extends around substantially all of the transparent-medium peripheral rim 30. Preferably and as illustrated, there are at least two turns of modified optical fiber 44, and in the illustrated case exactly two turns of modified optical fiber 44, extending around substantially all of the transparent-medium peripheral rim 30. As used herein, a "turn" is a length of optical fiber extending at least most of the distance around the circumference of the transparent-medium peripheral rim 30. Where there are multiple turns, the lengths may be continuous or discrete and separated.

An optical fiber is a fiber or rod in which a ray of light introduced at one end travels the length of the optical fiber by total internal reflection, so that the energy of the light at the remote end is essentially the same as that at the end where the energy is introduced. However, in a "modified optical fiber" the lateral surface of the optical fiber is modified so that the total internal reflection is interrupted and there is a controlled loss of light through the modified lateral surface 42 of the modified optical fiber 44. The modification is typically achieved by roughening the modified lateral surface 42 of the modified optical fiber 44 over a small fraction of its circumference, as by abrading or the like. Such modified optical fibers are known in the art for other applications and are described, for example, in U.S. Pat. Nos. 4,929,169 and 5,312,569, whose disclosures are incorporated by reference. As a result, there is a gradual and uniform loss of light energy from the modified optical fiber 44 through its modified lateral surface 42.

In the present approach, the modified optical fiber 44 is wrapped in one or more turns around the transparent-medium peripheral rim 30. An optional reflective layer 46 overlies the modified optical fiber 44, such that the modified optical fiber 44 lies between the reflective layer 46 and the transparent-medium peripheral rim 30. The reflective layer 46 is preferably a white material such as white polyethylene terepthalate polyester (mylar™) polymer. The reflective layer 46 may optionally have a metallic reflective coating or be a metal foil such as aluminum foil with a polished finish in facing relation to the modified optical fiber 44. The reflective layer 46 improves the efficiency of the target illumination by reflecting light initially emitted by the ring illumination source 38 in a direction away from the transparent-medium peripheral rim 30, back toward and through the transparent-medium peripheral rim 30 and thence to the target 34.

A transparent adhesive layer 48 binds the modified lateral surface 42 of the modified optical fiber structure 40 and the reflective layer 46 to the transparent-medium peripheral rim 30. The transparent-medium peripheral rim 30 is preferably polished and may be coated with appropriate antireflection coatings to minimize reflection when it is illuminated by the modified optical fiber structure 40. The adhesive layer 48 is selected using established principles to facilitate efficient optical coupling of light from the modified optical fiber structure 40 into the transparent medium 22.

The adhesive layer 48 fills the void between the transparent peripheral rim 30, the turns of the modified optical fiber 44, and the reflective layer 46. The adhesive layer 48 is optically transmissive to the light being emitted by the modified optical fiber 44. The optics industry currently uses many types of transparent adhesives, either cured by application of ultraviolet light or by a chemically mixed catalyst, as in the case of a two-component epoxy. Typical sources of such transparent adhesives are Loctite, Noriand, and Epoxy Technology. For purposes of efficient transmission across boundary layers, all materials used for the reflective layer 48 are chosen in order to match or bridge the optical index of refraction (at the wavelength being employed) between substrates subject to the adhesive layer 48 and its optical joint. Additionally, the mechanical properties of the joint lead to selection based upon viscosity and thermal expansion. Because the reflective layer 46 has a reflective function, no index match is typically required, and mechanical joint parameters determine the materials selection. The modified optical fiber 44 has a high-index-of-refraction fiber core surrounded by a low-index-of-refraction cladding. As previously discussed, the cladding is modified to expose a region of the core which will leak illumination into the zone next tot he abraded region. The adhesive bridge is therefore required to match the index of the fiber core of the modified optical fiber 44 and the index of refraction of the transparent medium 22.

The transparent medium 22 and the core of the modified optical fiber 44 are preferably chosen to have about the same index of refraction. The index of refraction of the adhesive layer 48 is chosen to have about the same index of refraction as the transparent medium 22 and the core of the modified optical fiber 44. Efficiencies may be tuned, if required, by the application of optical coatings to the boundary layer of either or both the transparent medium peripheral rim 30 and the exposed surface of the fiber core. In practice, sufficient illumination is generated by the light source 50 that the optical coupling loss of the adhesive boundary layers is acceptable if the adhesive is properly chosen, without the need to require additional optical coatings. A typical target value of the index of refraction each of the adhesive layer 48, the transparent medium 22, and the core of the modified optical fiber 44 is about 1.5 at a light wavelength of 550 nanometers.

The illumination source 36 further includes a light source 50, such as a controllable-output light-emitting diode (LED) coupled into an end 52 of the modified optical fiber structure 40 at an insertion collimator 54. Preferably, the light source 50 is located remotely from the transparent medium 22 at the end of a pigtail length 56 of the modified optical fiber structure 40, as seen in FIG. 1. The pigtail length 56 is maintained as a perfect (i.e., not modified so as to have light leakage) portion of the optical fiber material. That is, only the portion of the optical fiber that contacts the transparent-medium peripheral rim 30 is modified to have light leakage out of its modified lateral surface 42. With this configuration, the light source 50 does not directly illuminate the transparent medium 22. The light source 50 may be of any operable color output. In one preferred approach, the scene has a scene predominant color band, and the light source has a color different from that of the scene predominant color band to provide a visual contrast with the scene. The light source color may not be visible if a fluorescent filler is used in the etched target 34.

FIG. 3 illustrates the manner of construction and assembly of a basic target structure assembly 58 shown in FIGS. 1–2. The target structure 20 is fabricated as three separate subassemblies, the transparent medium 22, the ring illumination source 38, and the light source 50. The target 34 is etched or otherwise introduced into the transparent medium 22 or the adjacent structure prior to assembly. The ring illumination source 38 (including the reflective layer 46) is fabricated and shaped. The transparent medium 22 is inserted into the ring illumination source 38 and cemented in place with the adhesive layer 48, and the light source 50 is plugged into the insertion collimator 54.

The ring illumination source 38 may be of any operable type. In a prototype of the target structure assembly 58, the ring illumination source 38 was a pair of modified optical fibers 44 having one end in light communication with the light source 50. Each modified optical fiber 44 was cleaved at its end remote from the light source 50 to create a nearly smooth flat surface over the fiber core. This flat region acts as a partial reflecting mirror having significant leakage. This end leakage was obscured from the transparent medium 22 by the application of black paint. An alternative is to apply a metallic coating to the cleaved face of the core of the modified optical fiber 44 to create a highly reflecting mirror.

The ring illumination source may be made in alternative, but for the present purposes equivalent, structures as well. For example, a single modified optical fiber 44 helically wrapped with multiple turns on the peripheral rim 30 may be used as the ring illumination source 38. The free end may be cleaved and coated, as described above. Alternatively, a single loop of the modified optical fiber 44, with both ends terminated at the light source 50, may be used.

The optical fibers used to make the modified optical fiber 44 are preferably of the large-core, multimode type. The modified fiber strands are individual fibers, so as to be able to alter the cladding on each optical fiber. The use of fiber bundles is therefore precluded except in the case of stratified layers of fibers or pre-bonded fiber bands having a number of adjacent parallel fibers which may be modified as a group to have a region of light leakage on each fiber along the same contact surface.

An application of particular interest is the use of the target structure assembly 58 with an image intensifier 70, illustrated schematically in FIG. 4. Image intensifiers are known in the art and are described, for example, in U.S. Pat. Nos. 5,283,427 and 5,414,557, whose disclosures are incorporated by reference. The following discussion is intended only to give basic features as related to the present application. One version of the image intensifier 70 includes a semiconductor conversion structure 72 which creates an electron current responsive to incident light and amplifies the electron current. The electron current impinges upon a phosphor layer 74 deposited upon the substrate 76. The phosphor layer 74 creates visible light responsive to the electron current, which visible light is viewed by the user of the image intensifier 70. The transparent-medium front face 26 of the target structure assembly 58 is contacted to the adjacent face of the substrate 76, so that the illuminated target 34 is close to and superimposed over the intensified visible image produced at the phosphor layer 74. With the uniformly peripherally illuminated target 34, there are no distracting shadows or glare resulting from the target illumination to interfere with the viewing of the intensified scene. Due to the illumination uniformity produced by the present approach, the diffuse and specular reflectivity of the phosphor layer 74 of the image intensifier 70 does not cause the observed scene to have non-uniform illumination artifacts.

The present invention has been reduced to practice and has been found to operate as described.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An illuminated target structure for viewing a scene, comprising:
   a transparent medium having
      a transparent-medium central region,
      a transparent-medium front face,
      a transparent-medium back face, and
      a transparent-medium peripheral rim extending between the transparent-medium front face and the transparent-medium back face;
   a light-reflective target in light communication with the transparent-medium central region; and
   an illumination source in contact with the transparent-medium peripheral rim, the illumination source comprising
      a modified optical fiber structure having a modified lateral surface in facing relation to the transparent-medium peripheral rim and having a light leakage through the modified lateral surface.

2. The illuminated target structure of claim 1, wherein the modified lateral surface of the modified optical fiber structure is controllably roughened over a limited portion of its circumference.

3. The illuminated target structure of claim 1, wherein the modified optical fiber structure extends around substantially all of the transparent-medium peripheral rim.

4. The illuminated target structure of claim 1, wherein the modified optical fiber structure comprises
   at least one turn of a modified optical fiber extending around substantially all of the transparent-medium peripheral rim.

5. The illuminated target structure of claim 1, wherein the modified optical fiber structure comprises
   at least one turn of a modified optical fiber extending around substantially all of the transparent-medium peripheral rim, and
   a reflective layer overlying the at least one turn of modified optical fiber, such that the at least one turn of the modified optical fiber lies between the reflective layer and the transparent-medium peripheral rim.

6. The illuminated target structure of claim 1, wherein the modified optical fiber structure comprises
   at least two turns of a modified optical fiber extending around substantially all of the transparent-medium peripheral rim.

7. The illuminated target structure of claim 1, further including
   a light-transparent adhesive layer bonding the modified lateral surface of the modified optical fiber structure to the transparent-medium peripheral rim.

8. The illuminated target structure of claim 1, wherein the illumination source further includes
   a light source coupled into an end of the modified optical fiber structure, wherein the light source is located remotely from the transparent medium and does not directly illuminate the transparent medium.

9. The illuminated target structure of claim 1, wherein the scene has a scene predominant color band, and wherein the illumination source further includes
   a light source having a color different from that of the scene predominant color band.

10. The illuminated target structure of claim 1, further including
    an image intensifier in facing relation to the transparent-medium front face.

11. The illuminated target structure of claim 1, further including
    an image intensifier in facing relation to the transparent-medium front face, wherein the image intensifier includes a phosphor layer.

12. The illuminated target structure of claim 11, wherein the light-reflective target lies at the transparent-medium front face.

13. An illuminated target structure for viewing a scene, comprising:
    a transparent medium having
       a transparent-medium central region,
       a transparent-medium front face,
       a transparent-medium back face, and
       a transparent-medium peripheral rim extending between the transparent-medium front face and the transparent-medium back face;
    an image intensifier in facing relation to the transparent-medium front face;
    a light-reflective target in light communication with the transparent-medium central region; and
    a circumferentially uniform ring illumination source in contact with the transparent-medium peripheral rim, the ring illumination source projecting a substantially uniform illumination into the transparent-medium peripheral rim wherein the ring illumination source comprises a modified optical fiber structure having a modified lateral surface in facing relation to the transparent-medium peripheral rim and having a light leakage through the modified lateral surface.

14. The illuminated target structure of claim 13, wherein the image intensifier includes a phosphor layer.

15. An illuminated target structure for viewing a scene, comprising:
    a transparent medium having
       a transparent-medium central region,
       a transparent-medium front face,
       a transparent-medium back face, and
       a transparent-medium peripheral rim extending between the transparent-medium front face and the transparent-medium back face;
    a light-reflective target within the transparent-medium central region, wherein the light-reflective target lies at the transparent-medium front face;
    an illumination source in contact with and extending around substantially all of the transparent-medium peripheral rim, the illumination source comprising
       a modified optical fiber structure having a modified lateral surface in facing relation to the transparent-medium peripheral rim and having a light leakage through the modified lateral surface, and
       a light source coupled into an end of the modified optical fiber structure, wherein the light source is located remotely from the transparent medium and does not directly illuminate the transparent medium; and
    an image intensifier in facing relation to the transparent-medium front face, wherein the image intensifier includes a phosphor layer.

16. The illuminated target structure of claim 15, wherein the modified optical fiber structure comprises
    at least one turn of a modified optical fiber extending around substantially all of the transparent-medium peripheral rim, and a reflective layer overlying the at least one turn of the modified optical fiber, such that the at least one turn of the modified optical fiber lies between the reflective layer and the transparent-medium peripheral rim.

17. The illuminated target structure of claim 15, further including a light-transparent adhesive layer binding the modified lateral surface of the modified optical fiber structure to the transparent-medium peripheral rim, wherein the transparent adhesive layer is selected to facilitate efficient optical coupling of light from the modified optical fiber structure into the transparent medium.

18. The illuminated target structure of claim 15, wherein the scene has a scene predominant color band, and wherein the illumination source further includes a light source having a color different from that of the scene predominant color band.

* * * * *